(12) United States Patent
Fukami

(10) Patent No.: US 6,492,927 B2
(45) Date of Patent: Dec. 10, 2002

(54) DIGITAL-SIGNAL RECEIVING APPARATUS

(75) Inventor: Tadashi Fukami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/835,456

(22) Filed: Apr. 16, 2001

(65) Prior Publication Data

US 2001/0032027 A1 Oct. 18, 2001

(30) Foreign Application Priority Data

Apr. 18, 2000 (JP) ........................................ 2000-116198

(51) Int. Cl.$^7$ ................................................. H03M 1/66

(52) U.S. Cl. ........................... 341/144; 341/60; 348/571

(58) Field of Search ................................. 341/144, 155, 341/145, 143, 81, 60, 61

(56) References Cited

U.S. PATENT DOCUMENTS

| | | | | |
|---|---|---|---|---|
| 5,058,111 A | * | 10/1991 | Kihara et al. | ............... 370/94.1 |
| 5,293,586 A | * | 3/1994 | Yamazaki et al. | ........... 395/164 |
| 5,850,260 A | * | 12/1998 | Rosenberg | ................... 348/416 |
| 5,915,214 A | * | 6/1999 | Reece et al. | ................. 455/406 |
| 6,208,247 B1 | * | 3/2001 | Agre et al. | .................. 340/539 |

* cited by examiner

Primary Examiner—Brian Young
Assistant Examiner—John Nguyen
(74) Attorney, Agent, or Firm—Jay H. Maioli

(57) ABSTRACT

A plurality of data items are received in each frame period, and a digital signal processor (DSP) checks a flag corresponding to each data item in each frame period before the DSP applies processing to the received data. When the checked flag allows the corresponding data item to be processed, the process is performed. When the execution of the process is finished, the flag is reset. When all the flags are reset, the DSP enters a sleep state.

9 Claims, 3 Drawing Sheets

DIGITAL-SIGNAL RECEIVING APPARATUS

BACKGROUND OF THE INVENTION

1. Field of the Invention

The present invention relates to receivers for digital broadcasting.

2. Description of the Related Art

In Europe, Digital Audio Broadcasting (DAB, registered trademark) has been performed as digital sound broadcasting according to a European Research Coordinating Agency (Eureka) 147 specification. In DAB, various encoding processes are applied to a plurality of digital data items to convert them finally to an orthogonal-frequency-division-multiplex (OFDM) signal, and a main carrier signal is differential-quadrature-phase-shift-keying (D-QPSK) modulated by the OFDM signal to form a transmission signal. Digital audio data and other digital data of up to 64 channels can be broadcasted at the same time.

FIG. 3 shows the structure of the OFDM signal in the time domain. The OFDM signal is formed of a plurality of frames. Each frame is formed of (m+1) symbols. DAB has four transmission mode. In mode II, for example, the time length of a frame is 24 ms and the number (m+1) of symbols is 76.

Each frame is divided into a synchronizing channel SC, a fast information channel FIC, and a main service channel MSC, with symbols being used as units. The synchronizing channel SC is used for processing, such as frame synchronization and automatic frequency control (AFC), in receivers. The synchronizing channel SC is formed of two symbols, the first symbol thereof is a null symbol NULL, and the second symbol thereof is a symbol TFPR used for phase reference.

The fast information channel FIC is used for providing data related to the main service channel MSC, and includes data, such as the time, the date, a type, a data arrangement, and traffic and message control data. The main service channel MSC includes digital audio data and various digital data items serving as main data.

DAB receivers need to perform signal processing, such as orthogonal demodulation, fast Fourier transform (FFT), OFDM demodulation, deinterleaving, error correction, and digital-to-analog (D/A) conversion, in response to signal processing performed at a transmitting side. Some of these signal processing items are executed in general by a digital signal processor (DSP). The DSP is always in an operating state while DAB is being received, and does not enter a sleep state (idle state).

SUMMARY OF THE INVENTION

The present invention has been made in consideration of the following condition. It is an object of the present invention to allow the DSP for processing digital sound broadcasting (DSB) data to enter a sleep state to reduce power consumption.

The foregoing object is achieved in one aspect of the present invention through the provision of a receiving apparatus for receiving a signal having a plurality of types of data in each frame period, including a plurality of accumulation means for accumulating the plurality of types of data, respectively, in each frame period; at least one calculation-processing means for processing each of the plurality of types of data accumulated by the plurality of accumulation means; and storage means for storing information indicating that each of the plurality of types of data has been accumulated into accumulation means, wherein the calculation-processing means applies processing to data accumulated into accumulation means, corresponding to information indicating the completion of data accumulation stored in the storage means.

In the receiving apparatus, since calculation processing starts with data which has been accumulated among the plurality of types of data, each processing is sequentially performed from the beginning of a frame period, a period is formed near the end point of the frame period, in which the calculation-processing means can enter, for example, a sleep mode.

The receiving apparatus may be configured such that the storage means further stores information indicating the order of priority in which processing is applied to each of the plurality of types of data, and the calculation-processing means applies processing to the plurality of types of data in the order of priority.

Therefore, when the calculation-processing means is ready to start processing, if two or more data items need to be processed, data processing is performed in an appropriate order according to the order of priority.

The receiving apparatus may be configured such that the storage means further stores information indicating the completion of processing applied to each of the plurality of types of data, and the calculation-processing means enters a sleep state when all processing applied to the plurality of types of data has been completed.

With this configuration, since it is positively checked that all processing applied to the data has been completed, before the calculation-processing means enters a sleep state in a sleep period formed near the end point of a frame period, the calculation-processing means enters the sleep state without any problems.

The receiving apparatus may be configured such that the storage means further stores information indicating that corresponding data is allowed to be processed, and the calculation-processing means applies processing to data for which data processing is allowed among the plurality of types of data.

With this configuration, processing which does not need to be performed in the frame period is positively omitted, or data processing which cannot be started can be postponed. Therefore, a sleep period can be formed near the end point of a frame period.

The foregoing object is achieved in another aspect of the present invention through the provision of a receiving apparatus for receiving a signal having a plurality of types of data in each frame period, including a plurality of accumulation means for accumulating the plurality of types of data, respectively, in each frame period; at least one calculation-processing means for processing each of the plurality of types of data accumulated by the plurality of accumulation means; and storage means for storing information indicating that each of the plurality of types of data has been processed; wherein the calculation-processing means enters a sleep state when all processing applied to the plurality of types of data has been completed, according to the information indicating the completion of processing.

The foregoing object is achieved in still another aspect of the present invention through the provision of a receiving apparatus for receiving a signal having a plurality of types of data in each frame period, including a plurality of accumulation means for accumulating the plurality of types of data, respectively, in each frame period; at least one calculation-processing means for processing each of the plurality of types of data accumulated by the plurality of accumulation means; and storage means for storing information indicating that each of the plurality of types of data is allowed to be processed; wherein the calculation-processing means applies processing to data accumulated into the accumulation means corresponding to the storage means for storing information indicating that data is allowed to be processed.

The foregoing object is achieved in yet another aspect of the present invention through the provision of a receiving apparatus for receiving a signal having a plurality of types of data in each frame period, including a plurality of accumulation means for accumulating the plurality of types of data, respectively, in each frame period; at least one calculation-processing means for processing each of the plurality of types of data accumulated by the plurality of accumulation means; and storage means for storing information indicating that each of the plurality of types of data is allowed to be processed, information indicating that each of the plurality of types of data has been accumulated into accumulation means, information indicating the order of priority given to each of the plurality of types of data, and information indicating the completion of processing applied to each of the plurality of types of data, wherein the calculation-processing means performs data processing in the order of priority given to each data when a plurality of data corresponding to information indicating that data processing is allowed has been accumulated into the accumulation means, and the calculation-processing means enters a sleep state when all processing applied to the plurality of data has been completed.

DESCRIPTION OF THE PREFERRED EMBODIMENT

Figure 1:
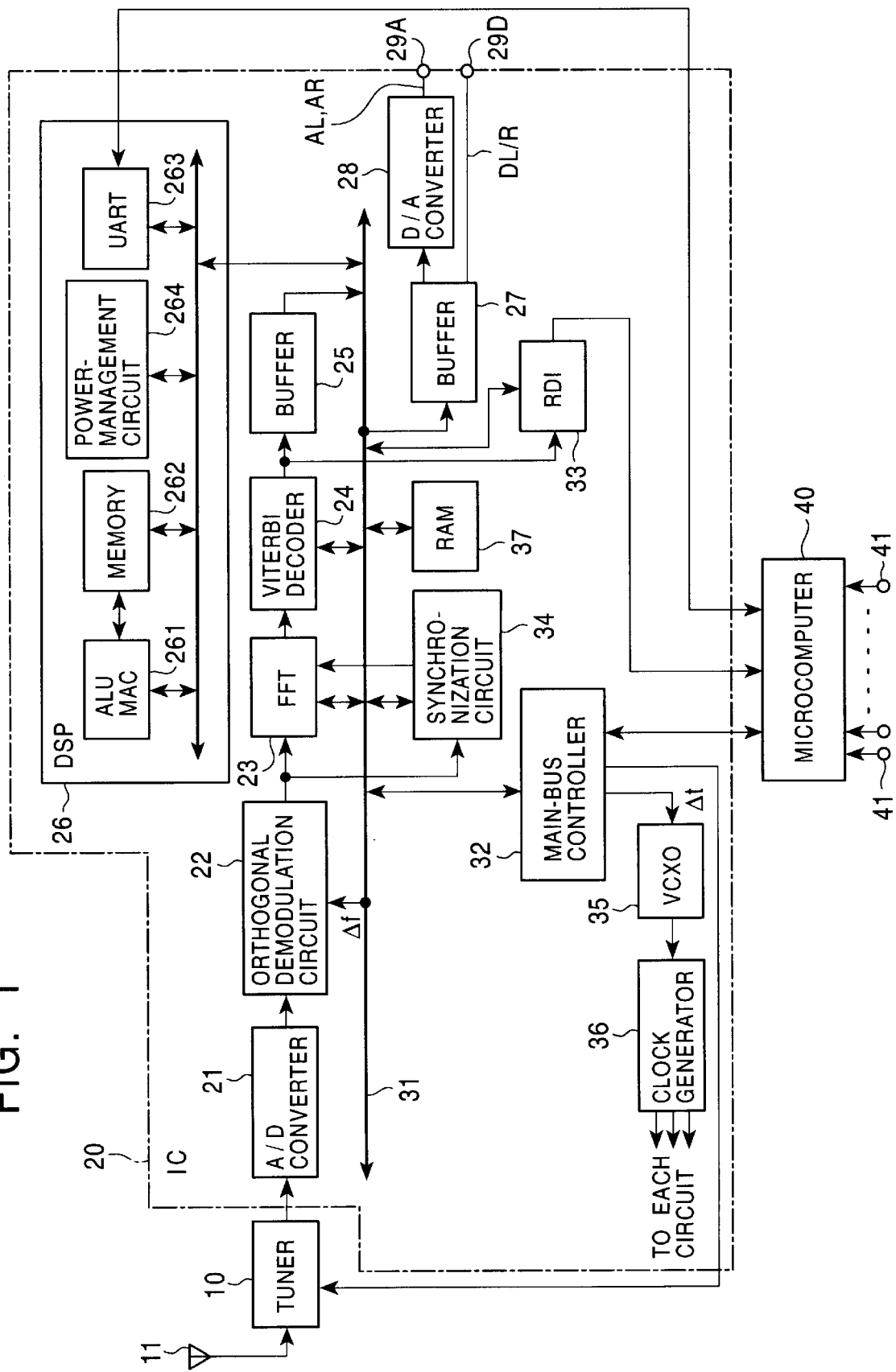
FIG. 1 is a block diagram of a receiver according to an embodiment of the present invention.

In FIG. 1, there are shown a tuner circuit 10 for receiving DAB, an integrated circuit (IC) 20, and a microcomputer 40 for system control.

The tuner circuit 10 uses a superheterodyne method and a synthesizer method, converts in frequency a target broadcasting signal to an intermediate-frequency signal (an intermediate frequency is set, for example, to 3.072 megahertz (MHz)) among broadcasting signals received by an antenna 11, and sends it to the IC 20.

The IC 20 takes the audio signal of a target program out of the received intermediate-frequency signal. Circuits 21 to 37 surrounded by a chain line are integrated into the IC 20. The microcomputer 40 is connected to the IC 20, and is also connected to various operation keys (operation switches) 41.

In the IC 20, the intermediate-frequency signal sent from the tuner circuit 10 is input to an analog-to-digital (A/D) converter circuit 21, and is converted to a digital signal. The digital signal is sent to an orthogonal demodulation circuit 22, and the data of an in-phase component and orthogonal components (real-axis component and imaginary-axis component) is demodulated. Complex Fourier conversion is applied to demodulated data by an FFT circuit 23, and frequency components are output in units of symbols. The frequency components are input to a Viterbi decoder 24, deinterleaving and error correction are applied to the components, and the target program is selected to select the digital audio data of the target program.

Then, the digital audio data of the selected program is sent to a main bus 31 through a buffer circuit 25. The main bus 31 is connected to a main-bus controller 32. The main-bus controller 32 controls data flow between the main bus 31 and circuits connected to the main bus 31, and achieves data access between tile microcomputer 40 and circuits 35 and 36, described later. The digital audio data sent to the main bus 31 through the buffer circuit 25 is further sent to a DSP 26.

The DSP 26 includes a central processing unit (CPU) 261, a memory 262 to which a program to be executed by the CPU 261 and data are loaded, a universal asynchronous receiver/transmitter (UART) 263 for achieving data access to an external device, and a power-management circuit 264. The CPU 261 has an arithmetic and logic unit (ALU) for executing arithmetic calculations (not including multiplications) and logical calculations, and a multiply and accumulate (MAC) unit for executing sum-of-products calculations.

When the DSP 26 receives digital audio data, it executes Motion-Picture-Image-Coding-Experts-Group (MPEG) audio decoding processing, and therefore, outputs decompressed data, that is, the original digital audio data.

The DSP 26 sends the digital audio data through the main bus 31, and further through a buffer circuit 27 to a D/A converter circuit 28. The D/A converter circuit 28 converts the data to analog audio signals AL and AR, and sends them to a terminal 29A. The digital audio data sent to the buffer circuit 27 is output as a serial digital output DL/R to a terminal 29D.

A part of the output of the Viterbi decoder circuit 24 is sent to the microcomputer 40 through a radio-data-interface (RDI) circuit 33.

Figure 3:
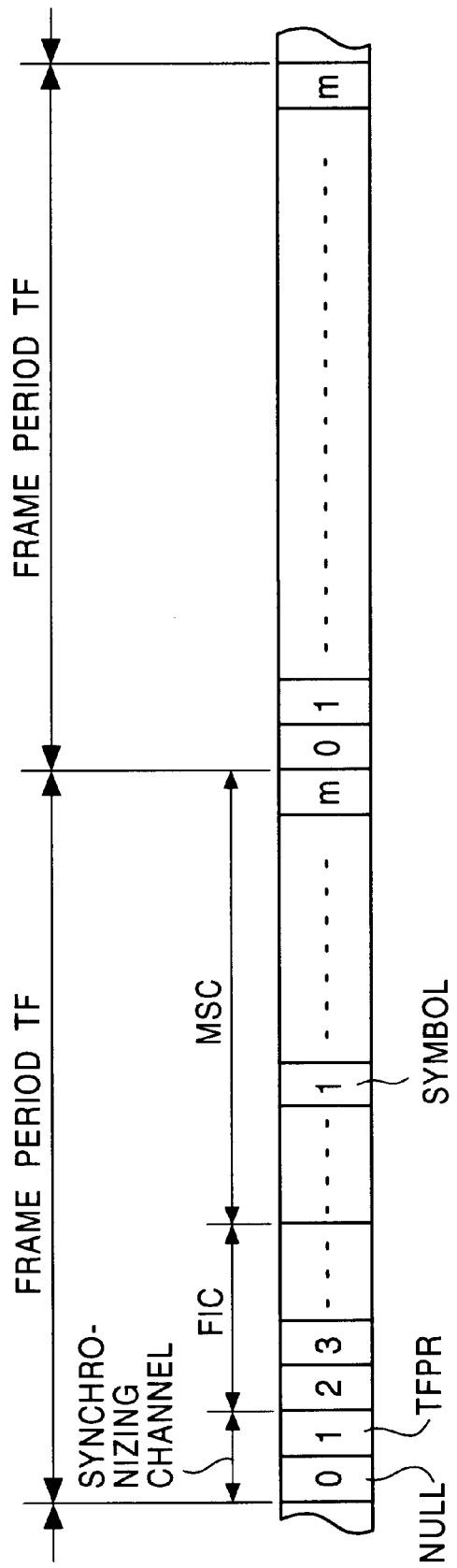
FIG. 3 is a view illustrating the present invention.

The output of the orthogonal demodulation circuit 22 is also sent to a synchronization circuit 34. The output of the synchronization circuit 34 is sent to the DSP through the main bus 31. The information of the symbol TFPR (see FIG. 3) for phase reference obtained by the FFT circuit 23 is sent to the DSP 26 through the main bus 31. The correlation between the output of the synchronization circuit 34 and the symbol TFPR for phase reference is obtained to calculate offsets Δt and Δf of the intermediate-frequency signal in a time-domain direction and a frequency-domain direction.

Intermediate-frequency- signal synchronization processing is executed by the use of the calculated offsets Δt and Δf. More specifically, the oscillating signal of a voltage-controlled crystal oscillator (VCXO) 35 is sent to a clock generator 36 to generate various clocks, and the clocks are sent to circuits. Data indicating the offset At in the time-domain direction is sent from the DSP 26 through the main-bus controller 32 to the VCXO 35 as a control signal to compensate for the offset error of the intermediate-frequency signal in the time-domain direction.

Data indicating the offset Δf in the frequency-domain direction is sent from the DSP 26 through the main-bus controller 32 to the orthogonal demodulation circuit 22 to compensate for the frequency offset of the intermediate-frequency signal. AFC is performed.

A work-area RAM 37 is connected to the main bus 31. Various data items are accessed between the interface circuit 33 and the microcomputer 40. When an operation for changing the receiving frequency is performed by keys 41, for example, the microcomputer 40 sends the corresponding data to the tuner circuit 10 through the main-bus controller 32 to change the receiving frequency.

Since the OFDM signal repeats every frame period TF, the DSP 26 repeats the same processing every frame period TF. In the present invention, the DSP 26 performs processes related to processing for obtaining received digital data, at timing, for example, shown in FIG. 2.

Specifically, the digital audio data output from the Viterbi decoder circuit 24 is accumulated into the buffer circuit 25. When the (n−1)-th frame of the OFDM signal finishes at time t0, digital audio data in the (n−1)-th frame has been accumulated into the buffer circuit 25. A flag <1> indicating that one-frame digital audio data has been accumulated is set by the buffer circuit 25 at time t0.

At time t0, the n-th frame starts. When the n-th frame starts, the accumulation of the data of the null symbol Null, the data of the symbol TFPR for phase reference, and the data required for executing AFC into the input buffers of the FFT circuit 23 and the synchronization circuit 34 starts. When the accumulation has been completed, a flag <2> indicating the completion is set.

During the period of the fast information channel FIC, its data is sent from the Viterbi decoder circuit 24 through the main bus 31 to the main-bus controller 32 and is accumulated into the input buffer of the main-bus controller 32. When the fast information channel FIC finishes, since the accumulation of its data also finishes, a flag <3> indicating the completion of the accumulation is set. RDI data is sent from the Viterbi decoder circuit 24 to the RDI circuit 33 and is accumulated into the input buffer of the RDI circuit 33. When accumulation finishes, a flag <4> indicating the completion of the accumulation of the data is set.

As described above, in every frame period TF, data is accumulated. When accumulation is completed, the corresponding flag among the flags <1> to <4> is set. The flags <1> to <4> are set by the input buffers which accumulate the data corresponding to the flags. The states of the flags <1> to <4> are directly sent to the DSP 26 through a signal line (not shown).

The DSP 26 is in the sleep state until the starting time t0 of the n-th frame, which will be clear from the following description. When the flag <1> is set at time t0, the DSP 26 returns to the normal state from the sleep state, and starts decoding of one-frame digital audio data which has been accumulated at time t0. The decoded digital audio data is sequentially sent to the buffer circuit 27 as described above. The buffer circuit 27 outputs the received digital audio data at a correct data rate (sampling period).

When the DSP 26 finishes the decoding of the digital audio data at time t1, the DSP 26 resets the flag <1> and checks the flags <2> to <4>. Since the flag <2> has been set at time t1 in FIG. 2, the DSP 26 uses the data corresponding to the flag <2>, that is, the data which has been accumulated into the input buffers of the FFT circuit 23 and the synchronization circuit 34 to calculate the offsets Δt and Δf of the intermediate-frequency signal in the time-domain direction and the frequency-domain direction, as described above. By the result of the calculation, the offsets Δt and Δf are compensated for.

Figure 2:
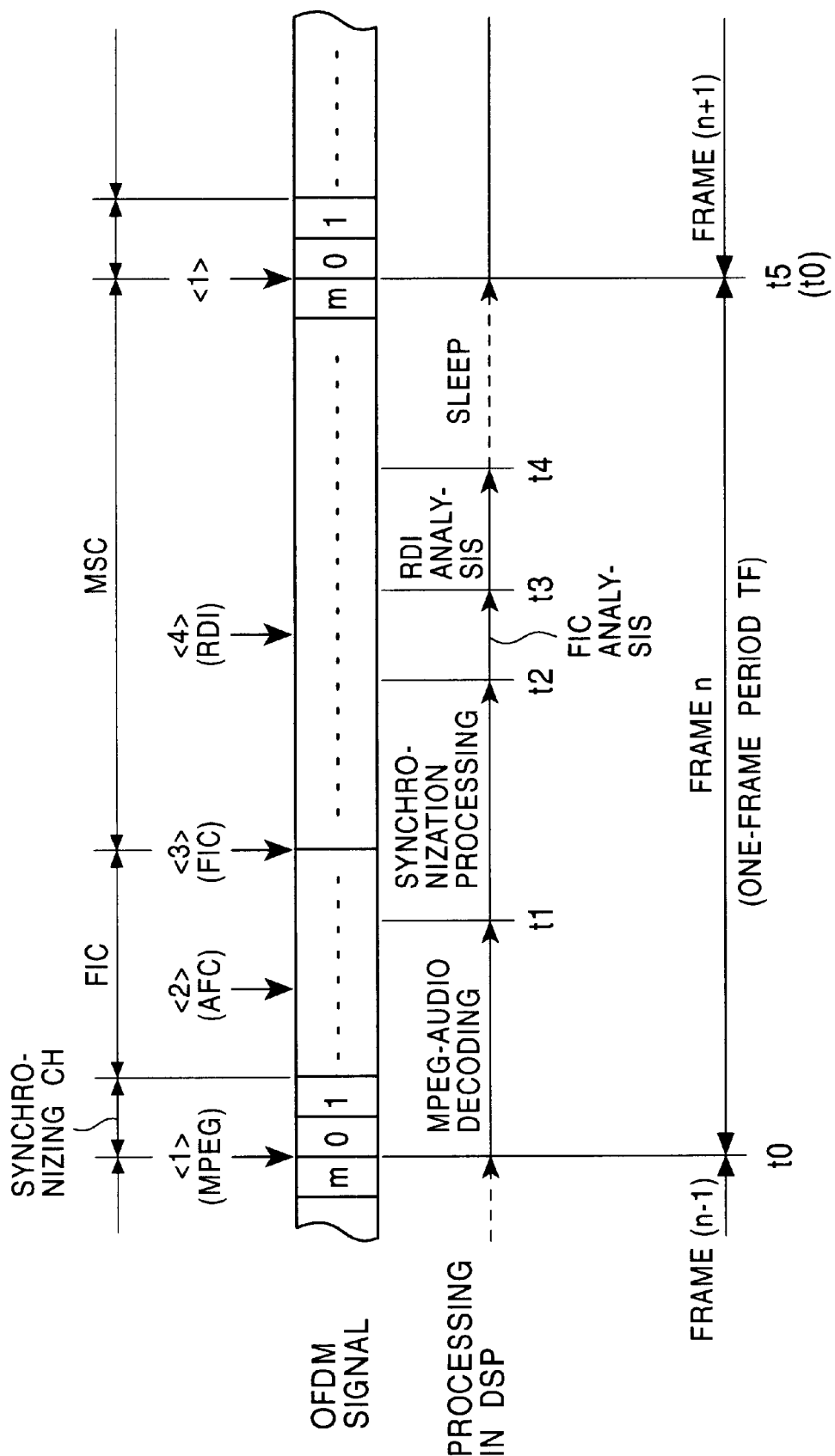
FIG. 2 is a timing chart for the embodiment of the present invention.

When the DSP 26 finishes synchronization processing at time t2, the DSP 26 resets the flag <2> and checks the remaining flags <3> and <4>. In FIG. 2, since the flag <3> has been set at time t2, the DSP 26 uses the data corresponding to the flag <3>, that is, the data which has been accumulated into the input buffer of the main-bus controller 32, to analyze the fast information channel FIC. The result of analysis is sent to the microcomputer 40 through the main bus 31 and the main-bus controller 32.

When the DSP 26 finishes analysis processing at time t3, the DSP resets the flag <3> and checks the remaining flag <4>. In FIG. 2, since the flag <4> has been set at time t3, the DSP performs the processing of the RDI data corresponding to the flag <4>. Specifically, the DSP 26 processes the data which has been accumulated into the input buffer of the RDI circuit 33, and sends the result of processing to the microcomputer 40 through the RDI circuit 33.

When the DSP 26 finishes the data processing of the RDI data at time t4, the DSP 26 resets the flag <4> and checks a remaining flag. In FIG. 2, since all the flags <1> to <4> have been reset at time t4, that is, data to be processed by the DSP 26 has been processed, the DSP 26 enters the sleep state at time t4.

When the starting time t5 (=t0) of the (n+1)-th frame comes, the same processing as that performed from the starting time t0 of the n-th frame is performed. The same processing as that performed in the n-th frame is thus repeated in each frame. Therefore, the DSP 26 has a sleep period from t4 to t5 in each frame period, as indicated by a dotted segment in FIG. 2.

The numbers assigned to the flags <1> to <4> indicate the order of priority in which the DSP 26 executes the corresponding processes. When the flags <1> to <4> are checked, and if the flags <2> and <4> have been set, for example, the data processing corresponding to the flag <2> is executed first. When a plurality of flags have been set, the data processing corresponding to a flag having a smaller number is executed earlier.

According to the receiver shown in FIG. 1, since the DSP 26 has the sleep period from t4 to t5 in each frame period TF, power consumption is reduced by the sleep state.

In addition, since the sleep state is generated without using a function such as an interrupt, simple control is used and the DSP 26 needs to have just a simple hardware structure.

In a case in which data for which calculation processing is not required in every frame period is included according to the format of data, it is possible that a flag is assigned to the data for which calculation processing is not required, or to data for which calculation processing is required, and the flag is checked in each frame period or at an interval of a predetermined period to apply data processing only to the data for which calculation processing is required. With these operations, unnecessary calculation processing is positively omitted, and a sleep period can be formed near the end point of a frame period.

In the above-described sleep period, a programmable calculation unit such as a DSP can be set to a sleep mode to reduce power consumption. In addition, it is also possible that another processing is executed by the DSP in this period to use the processing capability more effectively.

In the above description, the receiver may be configured such that the intermediate-frequency signal output from the tuner circuit 10 is orthogonal-demodulated to obtain an in-phase component and an orthogonal component, and these components are A/D-converted and sent to the FFT circuit 23. In the above description, the receiver receives DAB. The present invention can also be applied to receivers which receive other DSB when they process a plurality of types of received data items by the use of a programmable calculation unit such as a DSP in each frame period.

According to the present invention, the DSP has the sleep period and power consumption is reduced. Alternatively, another process can be performed in the sleep period. In addition, since the sleep state is formed without using a function such as an interrupt, control is simple and the DSP needs to have just a simple hardware structure.

What is claimed is:

1. A receiving apparatus for receiving a signal having a plurality of different types of data in each frame period, comprising:

a plurality of accumulation means for accumulating the plurality of different types of data, respectively, in each frame period;

at least one calculation-processing means for processing each type of data of the plurality of different types of data accumulated by the plurality of accumulation means; and storage means for storing information indicating that each type of data of the plurality of types of data has been accumulated by said plurality of accumulation means, wherein the at least one calculation-processing means applies processing to data accumulated by said plurality of accumulation means, corresponding to information indicating a completion of data accumulation stored in the storage means.

2. The receiving apparatus according to claim 1, wherein the storage means further stores information indicating an order of priority in which processing is applied to the plurality of different types of data, and the at least one calculation-processing means applies processing to the plurality of different types of data in the order of priority.

3. The receiving apparatus according to claim 1, wherein the storage means further stores information indicating the completion of processing applied to each of the plurality of different types of data, and the calculation-processing means enters a sleep state when all processing applied to the plurality of different types of data has been completed.

4. The receiving apparatus according to claim 2, wherein the storage means further stores information indicating the completion of processing applied to each of the plurality of different types of data, and the calculation-processing means enters a sleep state when all processing applied to the plurality of different types of data has been completed.

5. The receiving apparatus according to claim 2, wherein the storage means further stores information indicating whether each of the plurality of different types of data is allowed to be processed, and the calculation-processing means applies processing in the order of priority to data for which calculation processing is allowed among the plurality of different types of data.

6. A receiving apparatus for receiving a signal having a plurality of different types of data in each frame period, comprising:

a plurality of accumulation means for accumulating the plurality of different types of data, respectively, in each frame period;

at least one calculation-processing means for processing each type of data of the plurality of different types of data accumulated by the plurality of accumulation means; and storage means for storing information indicating that each type of data of the plurality of different types of data has been processed, wherein the at least one calculation-processing means enters a sleep state when all processing applied to the plurality of different types of data has been completed, according to the information indicating a completion of processing.

7. A receiving apparatus for receiving a signal having a plurality of different types of data in each frame period, comprising:

a plurality of accumulation means for accumulating the plurality of different types of data, respectively, in each frame period;

at least one calculation-processing means for processing each type of data of the plurality of different types of data accumulated by the plurality of accumulation means; and storage means for storing information indicating whether each type of data of the plurality of types of data is allowed to be processed, wherein the at least one calculation-processing means applies processing to data accumulated into the accumulation means corresponding to the storage means for storing information indicating that data is allowed to be processed.

8. The receiving apparatus according to claim 7, wherein the storage means further stores information indicating an order of priority in which processing is applied to the plurality of different types of data, and the at least one calculation-processing means applies processing in the order of priority to data for which calculation processing is allowed among the plurality of different types of data.

9. A receiving apparatus for receiving a signal having a plurality of different types of data in each frame period, comprising:

a plurality of accumulation means for accumulating the plurality of different types of data, respectively, in each frame period;

at least one calculation-processing means for processing each type of data of the plurality of different types of data accumulated by the plurality of accumulation means; and storage means for storing information indicating whether each type of data of the plurality of different types of data is allowed to be processed, information indicating that each type of data of the plurality of different types of data has been accumulated into accumulation means, information indicating an order of priority given to each type of data of the plurality of different types of data, and information indicating a completion of processing applied to each type of data of the plurality of different types of data, wherein the at least one calculation-processing means performs data processing in the order of priority given to each type of data when a plurality of data corresponding to the information indicating whether data processing is allowed has been accumulated by the plurality of accumulation means, and the at least one calculation-processing means enters a sleep state when all processing applied to the plurality of different types of data has been completed.

* * * * *